(12) United States Patent
Xiu et al.

(10) Patent No.: US 12,356,001 B2
(45) Date of Patent: *Jul. 8, 2025

(54) METHODS AND APPARATUS OF MOTION VECTOR ROUNDING, CLIPPING AND STORAGE FOR INTER PREDICTION

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,951

(22) Filed: Nov. 24, 2023

(65) Prior Publication Data

US 2024/0089489 A1 Mar. 14, 2024

Related U.S. Application Data

(63) Continuation of application No. 17/401,140, filed on Aug. 12, 2021, now Pat. No. 11,871,024, which is a
(Continued)

(51) Int. Cl.
*H04N 19/513* (2014.01)
*G06F 5/01* (2006.01)
(Continued)

(52) U.S. Cl.
CPC ............ *H04N 19/513* (2014.11); *G06F 5/01* (2013.01); *H04N 19/107* (2014.11);
(Continued)

(58) Field of Classification Search
CPC .. H04N 19/513; H04N 19/107; H04N 19/132; H04N 19/139; H04N 19/159;
(Continued)

(56) References Cited

U.S. PATENT DOCUMENTS

| 2013/0083853 A1 | 4/2013 | Coban et al. |
| 2013/0272410 A1 | 10/2013 | Seregin et al. |

(Continued)

FOREIGN PATENT DOCUMENTS

| CN | 103843347 A | 6/2014 |
| CN | 105009586 A | 10/2015 |
| CN | 106105205 A | 11/2016 |

OTHER PUBLICATIONS

International Search Report of PCT Application No. PCT/US2020/018920 dated Jun. 24, 2020, (3p).
(Continued)

*Primary Examiner* — Jared Walker
(74) *Attorney, Agent, or Firm* — Arch & Lake LLP; Shen Wang; Hao Tan

(57) ABSTRACT

A method for video coding is provided, including: providing a motion vector (MV) rounding process that is configured to perform a MV rounding operation; applying the MV rounding process to at least a first MV used in a first prediction tool selected from a first set of tools including: pair-wise merge candidate, triangle prediction mode, and affine mode; and applying the MV rounding process to at least a second MV used in a second prediction tool selected from a second set of tools including: temporal motion vector prediction (TMVP), alternative temporal motion vector prediction (ATMVP), and merge mode with motion vector differences (MMVD).

9 Claims, 11 Drawing Sheets

Related U.S. Application Data continuation of application No. PCT/US2020/018920, filed on Feb. 19, 2020.

(60) Provisional application No. 62/816,025, filed on Mar. 8, 2019, provisional application No. 62/808,276, filed on Feb. 20, 2019.

(51) Int. Cl.

| | |
|---|---|
| *H04N 19/107* | (2014.01) |
| *H04N 19/132* | (2014.01) |
| *H04N 19/139* | (2014.01) |
| *H04N 19/159* | (2014.01) |
| *H04N 19/176* | (2014.01) |
| *H04N 19/189* | (2014.01) |
| *H04N 19/423* | (2014.01) |
| *H04N 19/54* | (2014.01) |

(52) U.S. Cl.
CPC ......... *H04N 19/132* (2014.11); *H04N 19/139* (2014.11); *H04N 19/159* (2014.11); *H04N 19/176* (2014.11); *H04N 19/189* (2014.11); *H04N 19/423* (2014.11); *H04N 19/54* (2014.11)

(58) Field of Classification Search
CPC .. H04N 19/176; H04N 19/189; H04N 19/423; H04N 19/54; H04N 19/433; H04N 19/105; H04N 19/109; H04N 19/117; H04N 19/52; H04N 19/70; H04N 19/96; G06F 5/01
See application file for complete search history.

(56) References Cited

U.S. PATENT DOCUMENTS

| | | |
|---|---|---|
| 2014/0253681 A1 | 9/2014 | Zhang et al. |
| 2015/0264354 A1 | 9/2015 | Zhang et al. |
| 2017/0142418 A1 | 5/2017 | Li et al. |
| 2018/0359483 A1 | 12/2018 | Chen et al. |
| 2019/0028736 A1 | 1/2019 | Karczewicz et al. |

OTHER PUBLICATIONS

Benjamin Bross, et al. Versatile Video Coding (Draft 4), Joint Video Experts Team (JVET) of ITU-T SG 16 WP 3 and ISO/IEC JTC 1/SC 29/WG 11, JVET-M1001-v7, 13th Meeting: Marrakech, MA, Janaury 18, 2019, (300p).

Philippe Hanhart, et al., Non-CE2: Motion vector clipping in affine sub-block motion vector derivation, Joint Video Experts Team (JVET) of ITU-T SG 16 WP 3 and ISO/IEC JTC 1/SC 29/WG 11, JVET-M0145-v1, 13th Meeting: Marrakech, MA, Jan. 18, 2019 (3p).

Kai Zhang et al., AHG16: Clean-up on MV Rounding, Joint Video Experts Team (JVET) of ITU-T SG 16 WP 3 and ISO/IEC JTC 1/SC 29/WG 11, JVET-M0265, 13th Meeting: Marrakech, MA, Jan. 18, 2019, (2p).

Partial Supplementary European Search Report of EP Application No. 20759387.2 dated May 18, 2022, (16p).

Search Report of Chinese Application No. 202111092519.3 (4p).

First Office Action of Chinese Application No. 202111092519.3 dated Jul. 22, 2022 with English translation (21p).

Yu, Ruoyang et al., "CE2-related: ATMVP simplification", Joint Video Experts Team (JVET) of ITU-T SG 16 WP 3 and ISO/IEC JTC 1/SC 29WG11, JVET-M0116, 13th Meeting: Marrakech, MA, Jan. 9-18, 2019, (5p).

Van, Luong Pham, et al., "CE2-related: 4x4 chroma affine motion compensation and motion vector rounding unification", Joint Video Experts Team (JVET) of ITU-T SG 16 WP 3 and ISO/IEC JTC 1/SC 29/WG 11, JVET-M0462-v1, 13th Meeting: Marrakech, MOR, Jan. 14-18, 2019, (5p).

Bross, Bejamin et al., "Versatile Video Coding (Draft 4)", Joint Video Experts Team (JVET) of ITU-T SG 16 WP 3 and ISO/IEC JTC 1/SC 29/WG11, JVET-M1001-v3, 13th Meeting: Marrakech, MA, Jan. 9-18, 2019, (255p).

Versatile Video Coding Draft 4, (160p).

First Office Action issued to EP Application No. 20759387.2 dated Aug. 31, 2022, (10p).

Bross, Benjamin et al., Versatile Video Coding (Draft 3), Joint Video Experts Team (JVET) of ITU-T SG 16 WP 3 and ISO/IEC JTC 1/SC 29/WG 11, JVET-L1001-v8, 12th Meeting: Macao, China Oct. 3-12, 2018, (229p).

Bross, Benjamin et al., Versatile Video Coding (Draft 4), Joint Video Experts Team (JVET) of ITU-T SG 16 WP 3 and ISO/IEC JTC 1/SC 29/WG 11, JVET-M1001-v3, 13th Meeting: Marrakech, MA, Jan. 9-18, 2019, (256p).

Benjamin et al., "Versatile Video Coding (Draft 4)," Joint Video Experts Team (JVET) of ITU-T SG 16 WP 3 and ISO/IEC JTC 1/SC 29/WG 11, JVET-M1001, 13th Meeting: Marrakech, MA, Jan. 9-18, 2019, (254p).

The First Office Action issued in CN Application No. 202410784235.8 dated Nov. 23, 2024 with English Translation, (7p).

The Non-Final Office Action issued in US Application No. 18732576 dated Jan. 3, 2025, (6p).

K. Misra and F. Bossen, "Non-CE4: On clipping of scaled motion vectors," Joint Video Experts Team (JVET) of ITU-T SG 16 WP 3 and ISO/IEC JTC 1/SC 29/WG 11, JVET-M0479, 13th Meeting: Marrakech, MA, Jan. 9-18, 2019 (4p).

FIG. 11

Weighting factor for the luminance samples (1102):

$$\frac{2}{8} \times P_1 + \frac{6}{8} \times P_2$$

$$\frac{4}{8} \times P_1 + \frac{4}{8} \times P_2$$

$$\frac{7}{8} \times P_1 + \frac{1}{8} \times P_2$$

Weighting factor for the chrominance samples (1104)

METHODS AND APPARATUS OF MOTION VECTOR ROUNDING, CLIPPING AND STORAGE FOR INTER PREDICTION

CROSS-REFERENCE TO RELATED APPLICATIONS

The present application is a continuation application of U.S. patent application Ser. No. 17/401,140, filed on Aug. 12, 2021, which is a continuation of International Application No.: PCT/US2020/018920, filed on Feb. 19, 2020, which is based upon and claims priority to U.S. Provisional Application No. 62/808,276, entitled "Methods and Apparatus on Motion Vector Rounding and Storage for Inter Prediction" filed on Feb. 20, 2019, and U.S. Provisional Application No. 62/816,025, entitled "Methods and Apparatuses on Motion Vector Rounding and Storage for Inter Prediction" filed on Mar. 8, 2019, both of which are incorporated by reference in their entirety for all purpose.

FIELD

The present application generally relates to video coding and compression, and in particular but not limited to, methods and apparatus of motion vector rounding, clipping and storage for video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Digital video devices implement video coding techniques, such as those described in the standards defined by Versatile Video Coding (VVC), Joint Exploration Test Model (JEM), MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

Video compression typically includes performing spatial (intra frame) prediction and/or temporal (inter frame) prediction to reduce or remove redundancy inherent in the video data. In block-based video coding, the input video signal is processed block by block. For each block (also known as a coding unit (CU)), spatial prediction and/or temporal prediction may be performed. Each CU can be coded in intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

In a Joint Video Experts Team (JVET) meeting, JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meetings.

SUMMARY

In general, this disclosure describes examples of techniques relating to motion vector rounding and clipping for video coding.

According to a first aspect of the present disclosure, there is provided a method for video coding, including: providing a motion vector (MV) rounding process that is configured to perform a MV rounding operation; applying the MV rounding process to at least a first MV used in a first prediction tool selected from a group consisting of: pair-wise merge candidate, triangle prediction mode, and affine mode; and applying the MV rounding process to at least a second MV used in a second prediction tool selected from a group consisting of: temporal motion vector prediction (TMVP) and alternative temporal motion vector prediction (ATMVP) and merge mode with motion vector differences (MMVD).

According to a second aspect of the present disclosure, there is provided a method for video coding, including: providing a motion vector (MV) clipping process that is configured to perform a clipping operation; applying the MV clipping process to at least a first MV used in a first prediction tool selected from a group consisting of: advance motion vector prediction (AMVP) mode, alternative temporal motion vector prediction (ATMVP) mode, triangle mode, merge mode with motion vector differences (MMVD) mode, decoder-side motion vector derivation (DMVR) mode and affine inheritance mode; and applying the MV clipping process to at least a second MV used in a second prediction tool selected from a group consisting of: explicit normal inter mode and explicit affine mode.

According to a third aspect of the present disclosure, there is provided an apparatus for video coding, including: a processor; and a memory configured to store instructions executable by the processor; where the processor, upon execution of the instructions, is configured to: provide a motion vector (MV) rounding process that is configured to perform a MV rounding operation; apply the MV rounding process to at least a first MV used in a first prediction tool selected from a group consisting of: pair-wise merge candidate, triangle prediction mode, and affine mode; and apply the MV rounding process to at least a second MV used in a second prediction tool selected from a group consisting of: temporal motion vector prediction (TMVP) and alternative temporal motion vector prediction (ATMVP) and merge mode with motion vector differences (MMVD).

According to a fourth aspect of the present disclosure, there is provided an apparatus for video coding, including: a processor; and a memory configured to store instructions executable by the processor; where the processor, upon execution of the instructions, is configured to: providing a motion vector (MV) clipping process that is configured to perform a clipping operation; applying the MV clipping process to at least a first MV used in a first prediction tool selected from a group consisting of: advance motion vector prediction (AMVP) mode, alternative temporal motion vector prediction (ATMVP) mode, triangle mode, merge mode with motion vector differences (MMVD) mode, decoder-side motion vector derivation (DMVR) mode and affine inheritance mode; and applying the MV clipping process to at least a second MV used in a second prediction tool selected from a group consisting of: explicit normal inter mode and explicit affine mode.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 11 is a schematic diagram illustrating weighted average of two uni-prediction samples along a partition edge for the triangle prediction mode in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
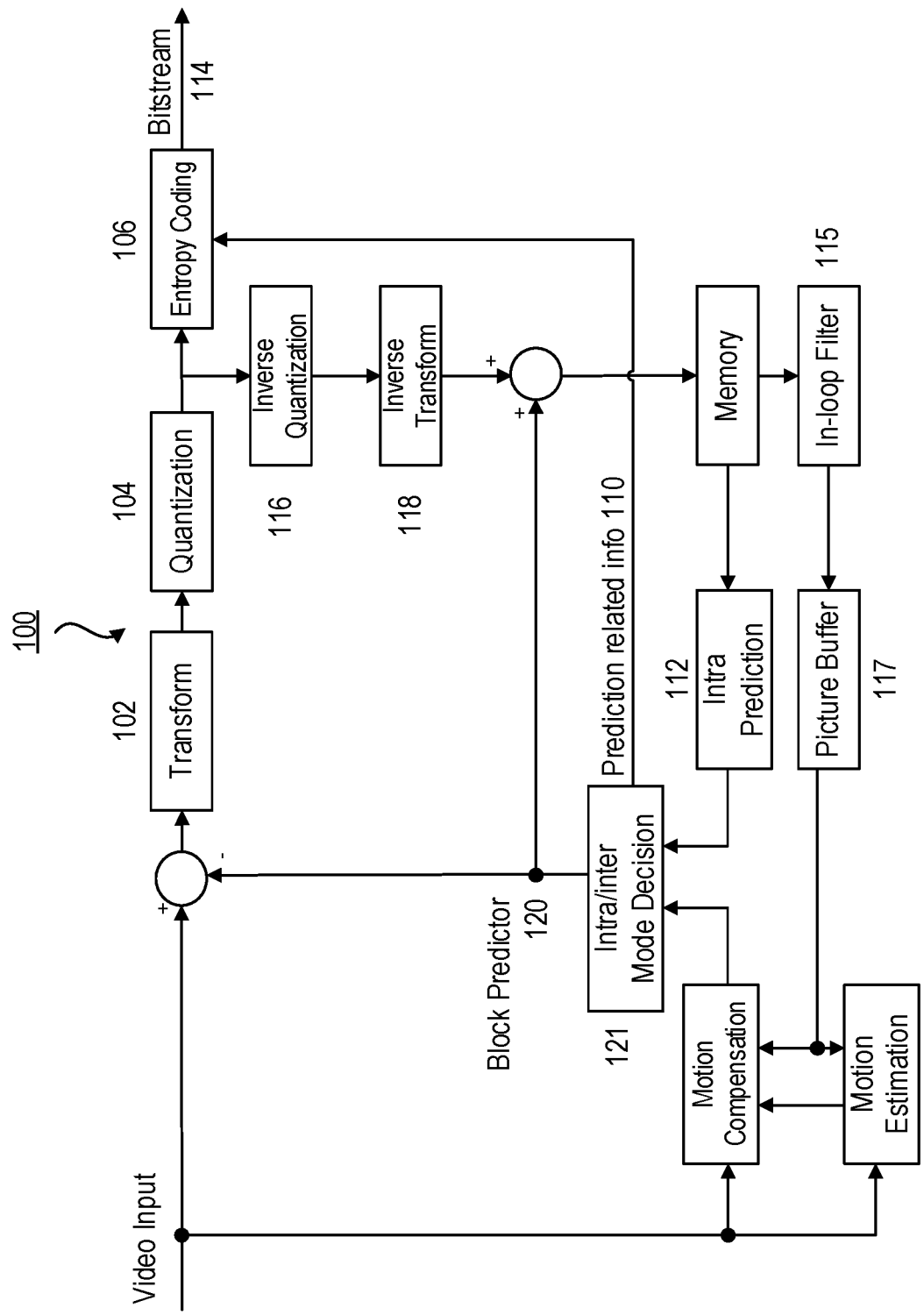
FIG. 1 is a block diagram illustrating an exemplary video encoder in accordance with some implementations of the present disclosure.

FIG. 1 shows a block diagram illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction" or "motion compensated prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
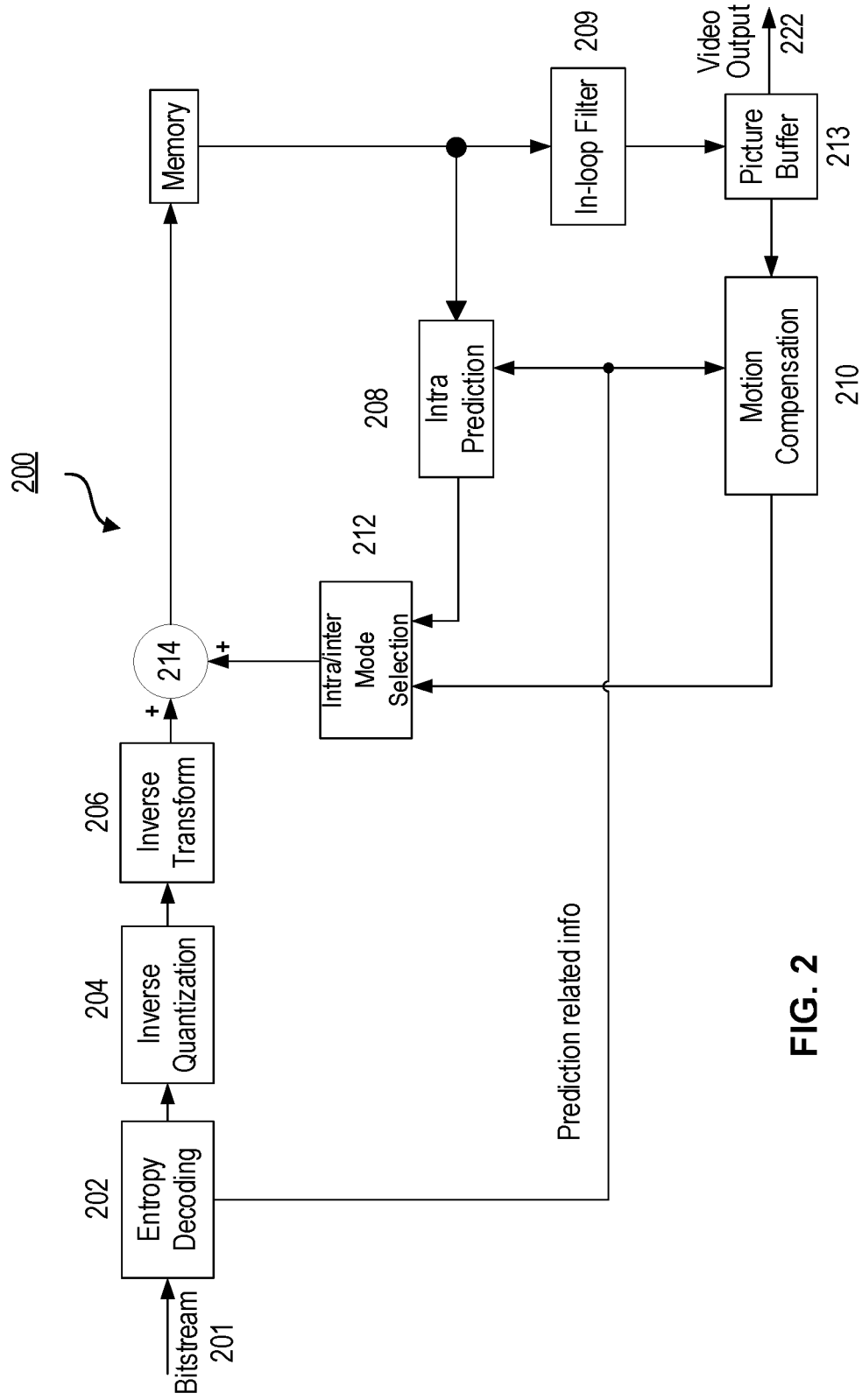
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Figure 3:
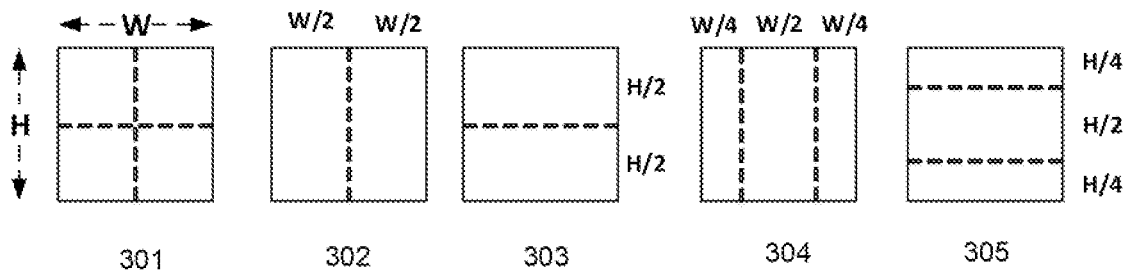
FIG. 3 is a schematic diagram illustrating block partitions in a multi-type tree structure in accordance with some implementations of the present disclosure.

FIG. 3 is a schematic diagram illustrating block partitions in the multi-type tree structure in the VVC. Like the HEVC, the VVC is built upon a block-based hybrid video coding framework. However, different from the HEVC which partitions blocks only based on quad-trees (i.e., quaternary trees), in the VVC, one coding tree unit (CTU) is split into coding units (CUs) to adapt to various local characteristics based on quad-trees, binary-trees or ternary-trees. In addition, the concept of multiple partition unit types in the HEVC is removed in the VVC, i.e., the separation of CU, prediction unit (PU) and transform unit (TU) does not exist in the VVC; instead, each CU is always used as the basic unit for both prediction and transform without further partitions. In the multi-type tree structure, one CTU is firstly partitioned by a quad-tree structure. Then, each quad-tree leaf node may be further partitioned by a binary or ternary tree structure into CUs. As shown in FIG. 3, there are five splitting types employed in the current VVC: quaternary partitioning 301, horizontal binary partitioning 302, vertical binary partitioning 303, horizontal ternary partitioning 304, and vertical ternary partitioning 305.

Regular Merge Mode

Like the HEVC, merge mode is supported in the VVC where the motion information of one coding block is not signaled but derived from a set of spatial and/or temporal merge candidates based on one competition-based scheme; and correspondingly, only the index of the selected merge candidate needs to be signaled from the encoder to the decoder to re-establish the motion information.

Figure 4:
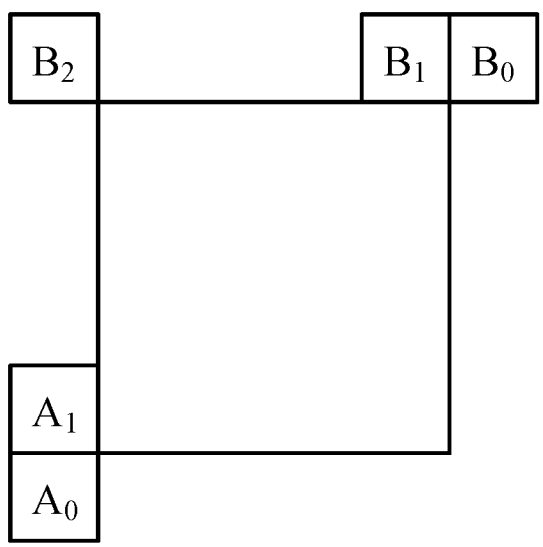
FIG. 4 is a schematic diagram illustrating positions of spatial merge candidates in VVC in accordance with some implementations of the present disclosure.

To construct the list of merge candidates, spatial motion vector candidates are firstly checked and added into the list. FIG. 4 illustrates the positions of the spatial merge candidates. The five spatial merge candidates are checked and added in the order of $A_1 \rightarrow B_1 \rightarrow B_0 \rightarrow A_0 \rightarrow B_2$. If the block located at one of the spatial positions is intra-coded or outside the boundary of the current slice, tile and/or picture, it is considered as unavailable.

Figure 5:
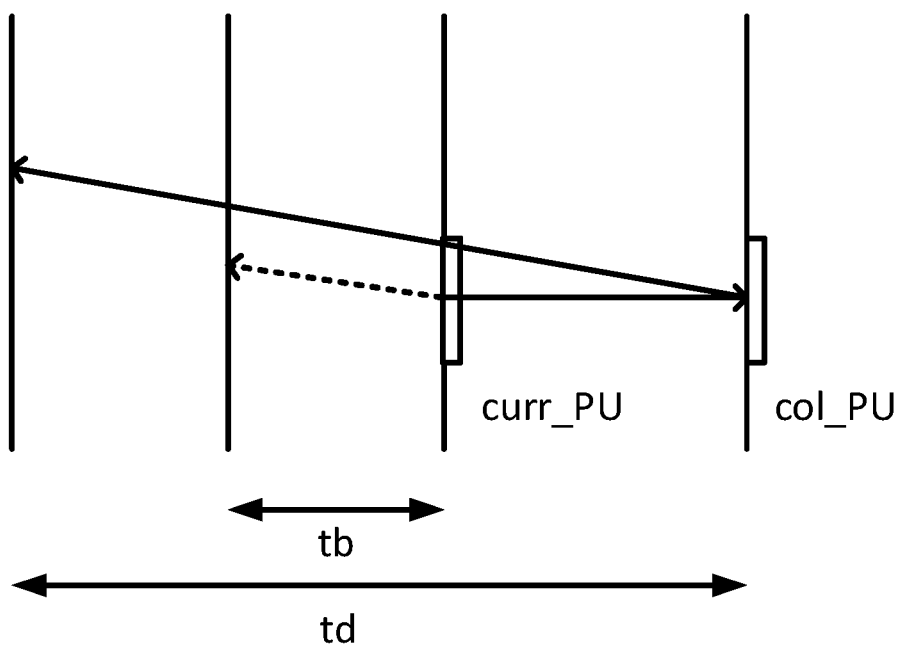
FIG. 5 is a schematic diagram illustrating a MV scaling operation used for temporal motion vector prediction (TMVP) in accordance with some implementations of the present disclosure.

After inserting all the valid spatial candidates into the merge candidate list, a temporal candidate is generated from the motion information of the co-located block in the co-located reference picture by temporal motion vector prediction (TMVP) technique. One scaled motion vector is derived based on the motion information of the co-located block in the co-located reference picture as signaled in the tile group or slice header. FIG. 5 illustrates motion vector scaling operation used for temporal motion vector prediction (TMVP). The scaled motion vector for the temporal merge candidate is obtained as illustrated by the dotted line in FIG. 5 through scaling from the motion vector of the co-located block col_PU using the Picture Order Count (POC) distances, tb and td, where tb is defined to be the POC difference between the reference picture of the current picture curr_ref and the current picture curr_pic and td is defined to be the POC difference between the reference picture of the co-located picture col_ref and the co-located picture col_pic.

When both the spatial and temporal motion vectors are inserted into the merge candidate list and the total number of the existing merge candidates in the list is less the maximum size of merge list (which is signaled in the tile group header), history-based merge candidates are added. The so-called history-based merge candidates include those motion vectors from previously coded CUs, which are maintained in a separate motion vector list, and managed based on certain rules such as a first-in-first-out (FIFO) rule.

After inserting the history-based candidates, if the merge candidate list is not full, pairwise average motion vector candidates are further added into the list. As its name indicates, this type of candidates is constructed by averaging candidates already in the current list. More specifically, based on a certain order or rule, two candidates in the merge candidate list are taken each time and the average motion vector of the two candidates is appended to the current list. After inserting pairwise average motion vectors, if the merge candidate list is still not full, zero motion vectors will be added to make the list full.

Affine Mode

Figure 6:
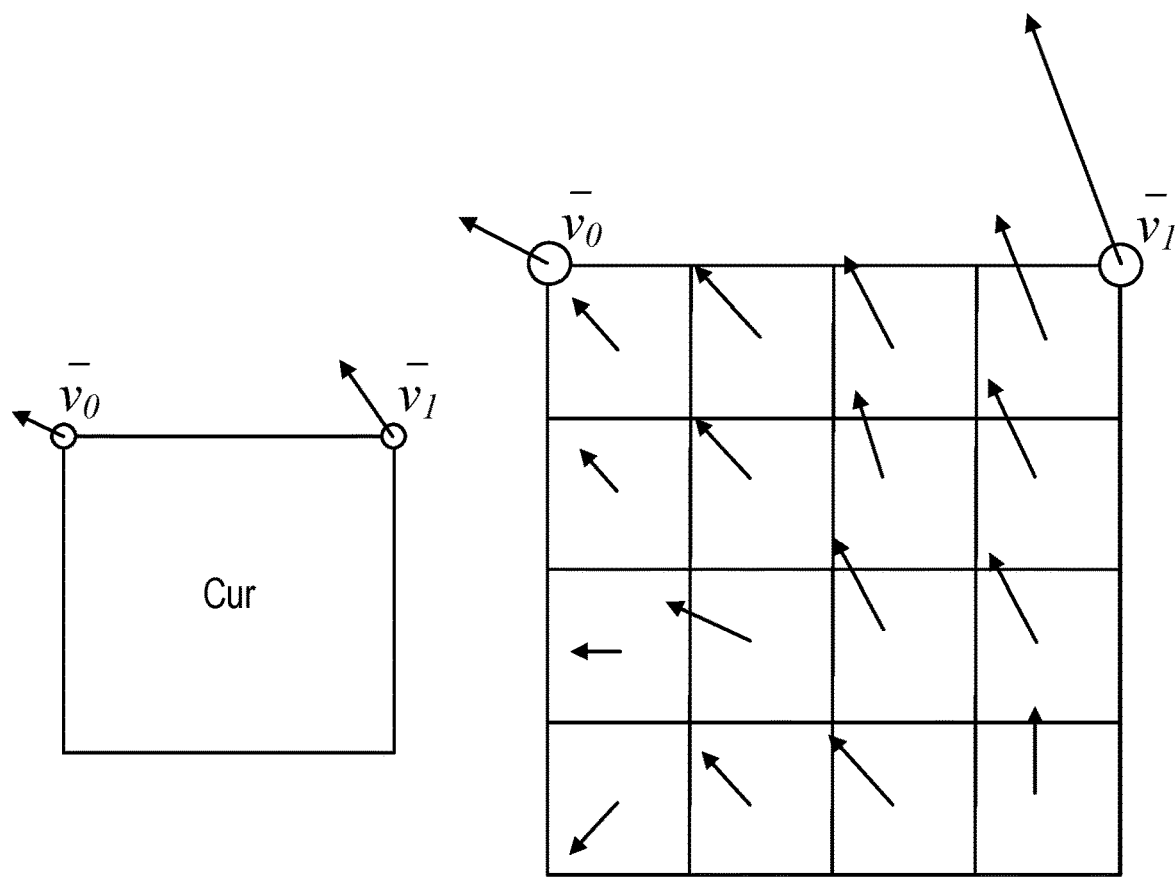
FIG. 6 is a schematic diagram illustrating 4-parameter affine model in accordance with some implementations of the present disclosure.
Figure 7:
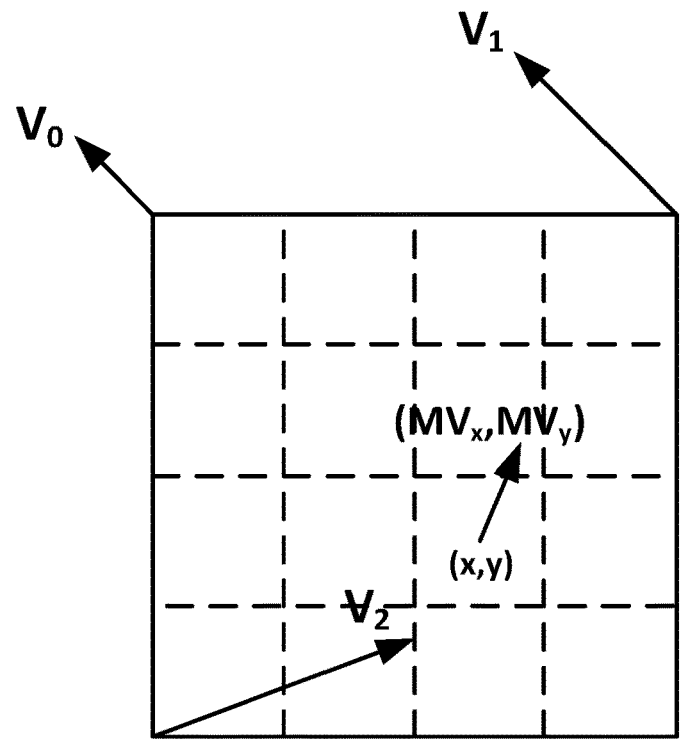
FIG. 7 is a schematic diagram illustrating 6-parameter affine model in accordance with some implementations of the present disclosure.

In the HEVC, only translation motion model is applied for motion compensated prediction. However, in the real world, there are many kinds of motions, e.g. zoom in/out, rotation, perspective motions and other irregular motions. In the VVC, affine motion compensated prediction is used by signaling one flag for each inter coding block to indicate whether the translation motion or the affine motion model is applied for inter prediction. For a VVC design disclosed herein, two affine modes, including 4-parameter affine model and 6-parameter affine model, may be supported for one affine coding block. FIGS. 6 and 7 illustrate the 4-parameter affine model and the 6-parameter affine model, respectively.

The 4-parameter affine model has the following parameters: two parameters for translation movements in the horizontal and vertical directions respectively, one parameter for zoom motion and one parameter for rotation motion for both the horizontal and vertical directions, in which the horizontal zoom parameter is equal to the vertical zoom parameter, and the horizontal rotation parameter is equal to the vertical rotation parameter. To achieve a better accommodation of the motion vectors and affine parameters, in the VVC, those affine parameters are translated into two MVs (which are also called control point motion vectors (CPMVs)) located at the top-left corner and top-right corner of a current block. As shown in FIG. 6, the affine motion field of the block is described by two control point MVs ($v_0$, $v_1$). Based on the control point motion, the motion field ($v_x$, $v_y$) of one affine coded block is described by the following equations:

$$v_x = \frac{(v_{1x} - v_{0x})}{w}x - \frac{(v_{1y} - v_{0y})}{w}y + v_{0x} \quad (1)$$

$$v_y = \frac{(v_{1y} - v_{0y})}{w}x - \frac{(v_{1x} - v_{0x})}{w}y + v_{0y}.$$

The 6-parameter affine mode has following parameters: two parameters for translation movements in the horizontal and vertical directions respectively, one parameter for zoom motion and one parameter for rotation motion in the horizontal direction, one parameter for zoom motion and one parameter for rotation motion in the vertical direction. The 6-parameter affine motion model is coded with three MVs which may also be referred to as three CPMVs. As shown in FIG. 7, the three control points of one 6-parameter affine block are located at the top-left, top-right and bottom left corners of the block. The motion at the top-left control point is related to the translation motion; the motion at the top-right control point is related to rotation motion and zoom motion in the horizontal direction; and the motion at the bottom-left control point is related to rotation motion and zoom motion in the vertical direction. Compared to the 4-parameter affine motion model, the rotation motion and zoom motion in the horizontal direction of the 6-parameter affine motion model may not be the same as those motions in the vertical direction. Assuming ($v_0$, $v_1$, $v_2$) are the MVs at the top-left, top-right and bottom-left corners of the current block in FIG. 7, the motion vector of each sub-block ($v_x$, $v_y$) is derived using the three MVs at the control points by the following equations:

$$v_x = v_{0x} + (v_{1x} - v_{0x}) * \frac{x}{w} + (v_{2x} - v_{0x}) * \frac{y}{h} \quad (2)$$

$$v_x = v_{0x} + (v_{1x} - v_{0x}) * \frac{x}{w} + (v_{2x} - v_{0x}) * \frac{y}{h}.$$

In the VVC, the CPMVs of affine coding blocks are stored in a separate buffer. The stored CPMVs are only used for the generation of the affine CPMV predictors for affine merge mode (i.e., inheriting affine CPMVs from that of neighboring affine blocks) and affine explicit mode (i.e., signaling the affine CPMVs based on prediction-based scheme). The sub-block MVs derived from the CPMVs are used for motion compensation, MV prediction of translational MVs and de-blocking.

Figure 8:
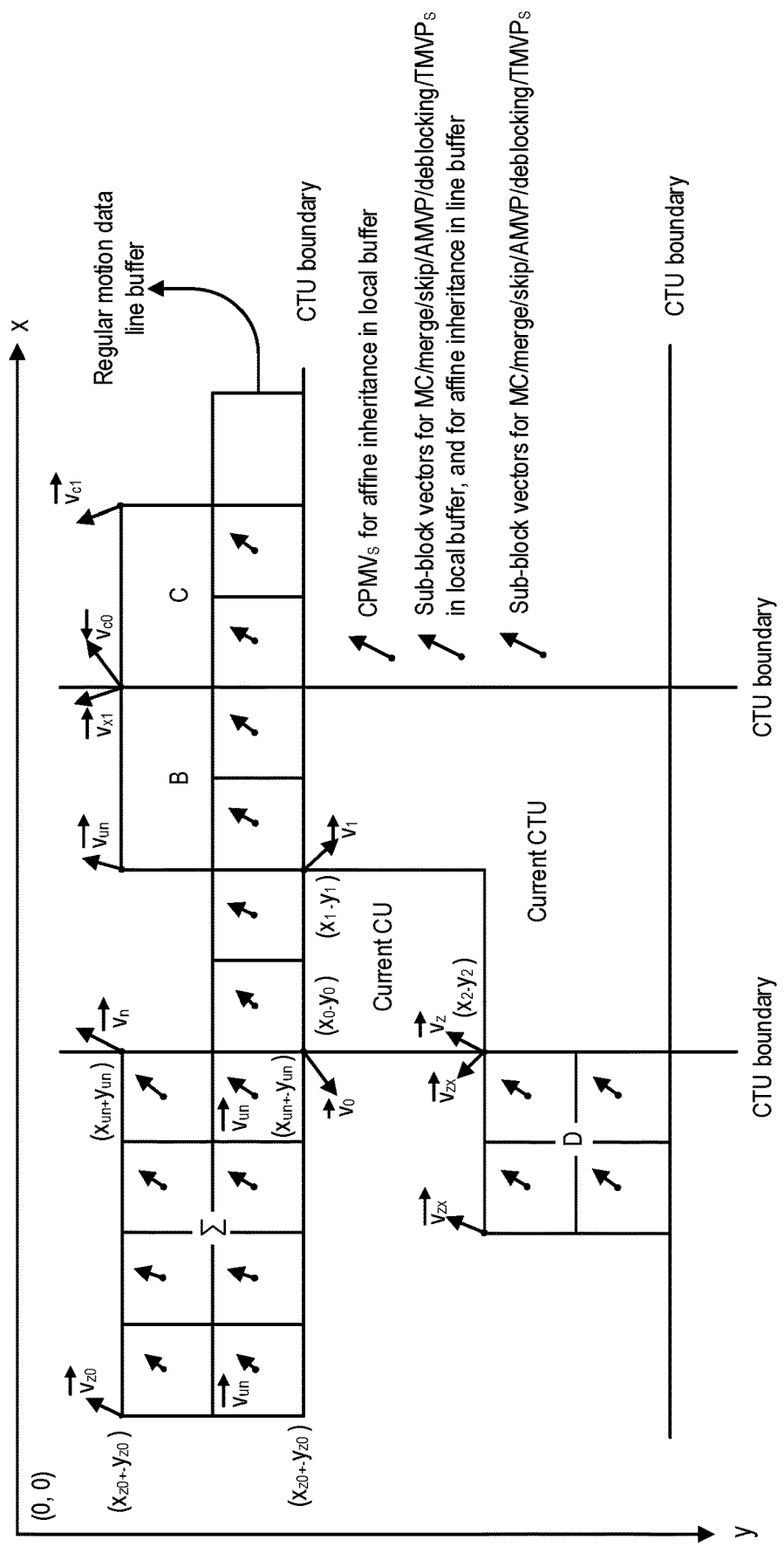
FIG. 8 is a schematic diagram illustrating an affine CPMV storage method in accordance with some implementations of the present disclosure.

FIG. 8 illustrates an affine CPMV storage method in the VVC. To avoid the picture line buffer size increase for additionally storing the CPMVs, the affine motion data inheritance from the coding blocks from the above CTU is treated differently from the affine motion data inheritance from the neighboring CUs in the same CTU. Specifically, for a current CU, if the spatial neighbor for affine motion data inheritance is in the above CTU line, the sub-block MVs in the line buffer instead of the CPMVs are used for the AMVP derivation for the current CU. In this way, the CPMVs are only stored in a local buffer (i.e., the affine blocks within one CTU) rather than in the line buffer. If the candidate CU is 6-parameter affine coded, the affine model is degraded to 4-parameter model. As shown in FIG. 8, along the top CTU boundary, the bottom-left and bottom right sub-block motion vectors of a block are used for affine inheritance of the CUs in bottom CTUs.

Triangle Prediction Mode

Figure 9:
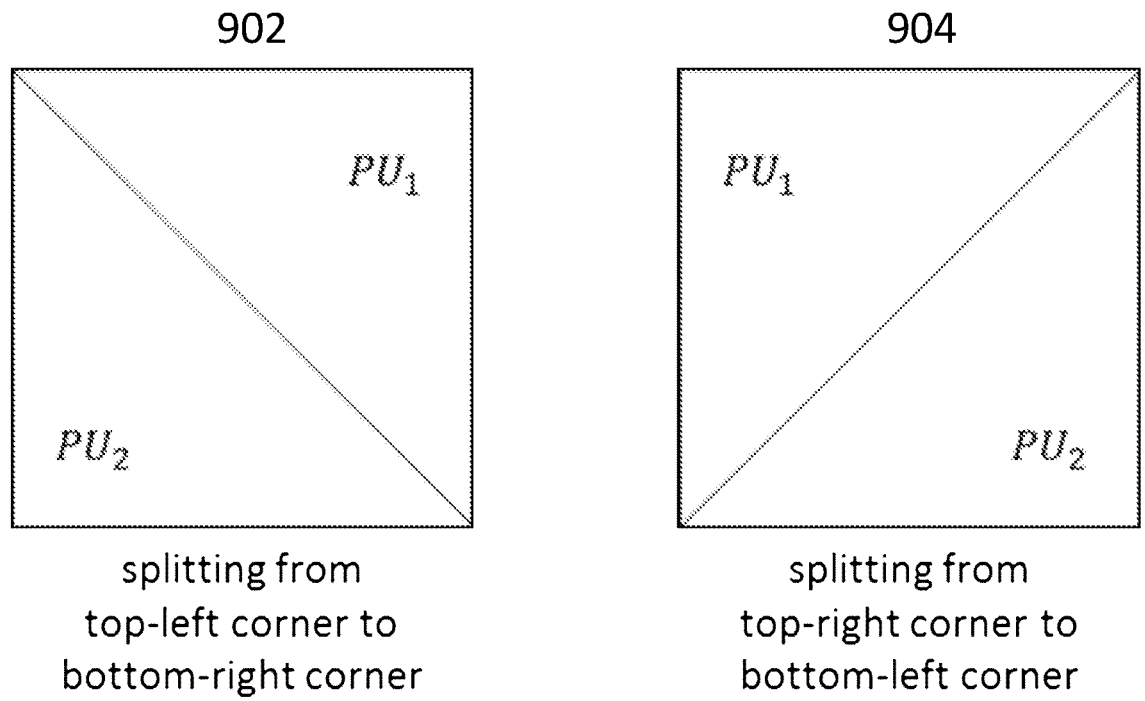
FIG. 9 is a schematic diagram illustrating triangle prediction partitions in accordance with some implementations of the present disclosure.

In the VVC, the triangle prediction mode is introduced for motion compensated prediction. FIG. 9 illustrates triangle prediction partitions in the VVC. As shown in FIG. 9, a CU 902, 904 is split into two triangular prediction units PU$_1$ and PU$_2$, in either the diagonal or the inverse diagonal direction (i.e., either splitting from top-left corner to bottom-right corner or splitting from top-right corner to bottom-left corner). Each triangular prediction unit in the CU is inter-predicted using its own uni-prediction motion vector and reference frame index which are derived from a uni-prediction candidate list. Along the diagonal border between the two triangular prediction units, each 4×4 sub-block is predicted using both uni-prediction signals. An adaptive weighting process is performed to the diagonal edge after predicting the triangular prediction units. Then, the transform and quantization process are applied to the whole CU. It is noted that this mode is only applied to skip and merge modes in the current VVC. Although in FIG. 9, the CU is shown as a square block, the triangle prediction mode may be applied to non-square (i.e. rectangular) shape CUs as well.

Figure 10:
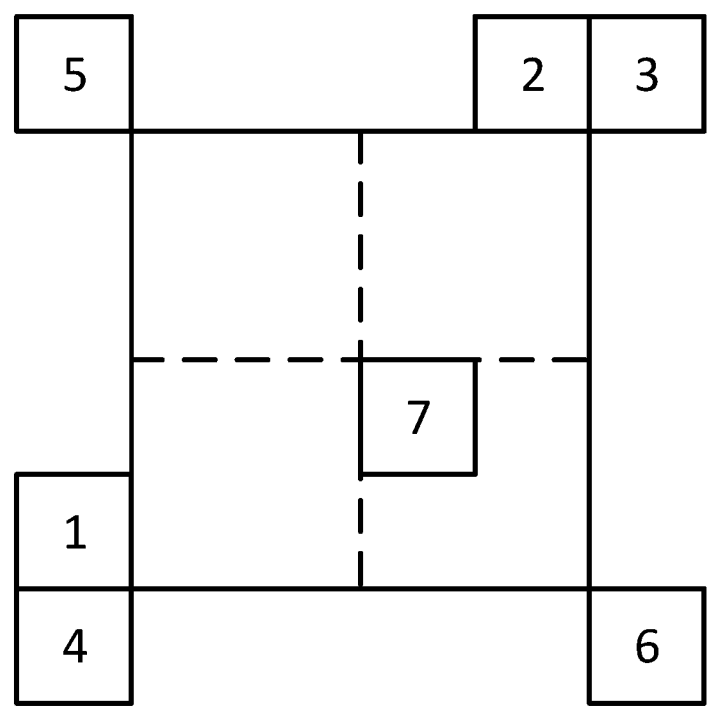
FIG. 10 is a schematic diagram illustrating positions of candidate blocks used for generating a uni-prediction MV list of triangle prediction mode in accordance with some implementations of the present disclosure.
Figure 12:
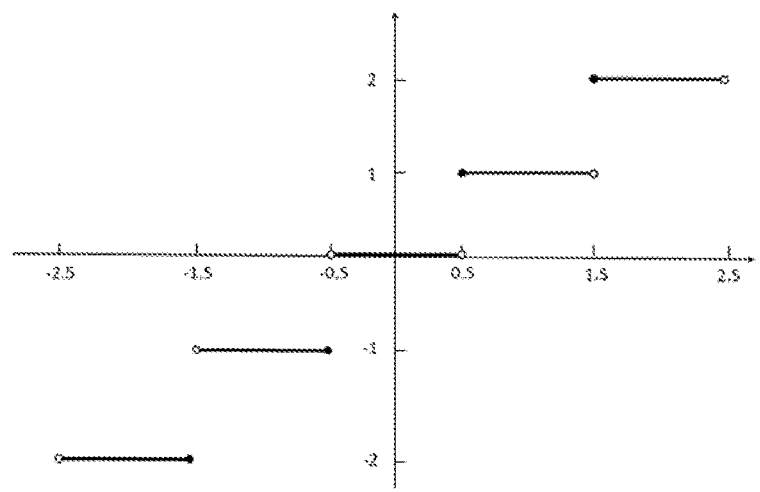
FIG. 12 is a schematic diagram illustrating a mapping function of absolute based MV rounding in accordance with some implementations of the present disclosure.

The uni-prediction MV candidate list may include one or more candidates, and each candidate may be a motion vector. FIG. 10 illustrates positions of candidate blocks used for generating the uni-prediction MV list for the triangle prediction mode. In some examples, the uni-prediction motion vector candidate list may include two to five uni-prediction motion vector candidates. In some other examples, other number may also be possible. The uni-prediction motion vector candidate list is derived from seven neighboring blocks including five spatial neighboring blocks (1 to 5) and two temporal co-located blocks (6 to 7), as shown in FIG. 10. The motion vectors of the seven neighboring blocks are collected into a first merge list. Then, a uni-prediction candidate list is formed based on the first merge list motion vectors according to a specific order. Based on the order, the uni-prediction motion vectors from the first merge list are put in the uni-prediction motion vector candidate list first, followed by reference picture List 0 or L0 motion vector of bi-prediction motion vectors, and then reference picture List 1 or L1 motion vector of bi-prediction motion vectors, and then followed by the averaged motion vector of the L0 and L1 motion vectors of bi-prediction motion vectors. At that point, if the number of candidates is still less than a target number (which is five in the current VVC), zero motion vectors are added to the list to meet the target number.

The respective prediction signal of each triangular partition is derived based on its uni-prediction MV. Additionally, to alleviate the blocking artifacts along the diagonal or inverse diagonal edge between two partitions, a weighting process is applied to the two uni-prediction signals of the samples along the partition edge to derive the final prediction for the CU. FIG. 11 shows an example of the weighting process, in which values {7/8, 6/8, 5/8, 4/8, 3/8, 2/8, 1/8} and {6/8, 4/8, 2/8} are used for the luminance samples 1102 and the chrominance samples 1104, respectively.

Merge Mode with Motion Vector Difference (MMVD)

In addition to the regular merge mode, where the implicitly derived motion information is directly used for the generation of prediction samples of the current CU, the merge mode with motion vector differences (MMVD) is introduced in the VVC. An MMVD flag is singled after sending a skip flag and merge flag to specify whether the MMVD mode is used for a CU.

In the MMVD, after a merge base candidate is selected, it is further refined by the signaled Motion Vector Differences (MVDs) information. The further information includes a merge candidate flag, a distance index to specify the motion magnitude, and a direction index for indication of the motion direction. In the MMVD mode, one of the first two candidates in the merge list is selected to be used as the MV basis (or a starting point). The merge candidate flag is signaled to specify which one is used.

The distance index specifies the motion magnitude information and indicates the pre-defined offset from the starting point. As shown in Table 1, an offset is added to either the horizontal component or the vertical component of the starting MV.

TABLE 1

Relation Between Distance Index and Pre-Defined Offset

| Distance IDX | 0 | 1 | 2 | 3 | 4 | 5 | 6 | 7 |
|---|---|---|---|---|---|---|---|---|
| Offset (in unit of luma sample) | 1/4 | 1/2 | 1 | 2 | 4 | 8 | 16 | 32 |

The direction index represents the direction of the MVD relative to the starting point. The direction index may represent the four directions as shown in Table 2. The meaning of the MVD sign (e.g., + or −) may be different according to the information of the starting MV. When the starting MV is a uni-prediction MV or bi-prediction MVs with both MVs pointing to the same side of the current picture (i.e. the POCs of two references are both greater than the POC of the current picture, or are both less than the POC of the current picture), the sign in Table 2 specifies the sign of MV offset added to the starting MV. When the starting MV is bi-prediction MVs with the two MVs pointing to the different sides of the current picture (i.e. the POC of one reference is greater than the POC of the current picture, and the POC of the other reference is less than the POC of the current picture), the sign in Table 2 specifies the sign of MV offset added to the list 0 MV component of the starting MV and the sign for the list 1 MV has the opposite value.

TABLE 2

Sign of MV Offset Specified by Direction Index

| Direction IDX | 00 | 01 | 10 | 11 |
|---|---|---|---|---|
| x-axis | + | − | N/A | N/A |
| y-axis | N/A | N/A | + | − |

Decoder-Side Motion Vector Derivation (DMVR)

Decoder-side motion vector derivation (DMVR) is a bi-prediction technique used for merge blocks with two initially signaled MVs that can be further refined by using bilateral matching prediction. The bilateral matching is used to derive motion information of the current CU by finding the best match between two blocks along the motion trajectory of the current CU in two different reference pictures. The cost function used in the matching process is row-subsampled sum of absolute difference (SAD). After the matching process is done, the refined MVs are used for motion compensation in the prediction stage, boundary strength calculation in deblock filter, and temporal motion vector prediction for subsequent pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distances from the current picture to the two reference pictures, TD0 and TD1 are the same, the bilateral matching becomes mirror based bi-directional MV.

MV rounding operation needs to be performed at multiple stages of motion compensated prediction in the VVC:

1) for the derivations of the MV predictors of the TMVP and the alternative temporal motion vector prediction (ATMVP), where the MV of temporal co-located block is scaled based on the ratio of the POC distance between the reference picture of the current picture and the current picture (i.e., tb in FIG. 5) and the POC distance between the reference picture of the co-located picture and the co-located picture (i.e., td in FIG. 5);

2) for the generation of pair-wise merge candidates by averaging the MVs of two spatial/temporal MV candidates;

3) for affine coding blocks, where the motion field of the respective sub-blocks is derived from the corresponding CPMVs according to the equations (1) for 4-parameter affine model and the equations (2) for 6-parameter affine model; and 4) for triangle prediction mode, where additional uni-prediction MV candidates are added into the final MV candidate list by averaging the L0 and L1 MVs of bi-prediction merge candidates.

Further, in addition to the current VVC specification, different MV rounding methods may be applied for the above inter prediction methods. Specifically, assuming A is the MV value before rounding and Shift is the right bit-wise shift that is applied for MV rounding, for different inter prediction methods, the value of the rounded MV, i.e., L, is calculated by $$L=(A>=0)?(A+\text{Offset})>>\text{Shift}:-((-A+\text{Offset})>>\text{Shift}) \quad (3)$$

for the Affine mode, pair-wise merge candidate generation and triangle prediction mode;

OR, $$L=(A+\text{Offset}+(A<0?1:0))>>\text{Shift} \quad (4)$$

for the TMVP and ATMVP;

where Offset is a rounding offset that is set equal to (Shift>0)?1<<(Shift−1):0; and L is a value of a rounded MV.

For the VVC, regarding the pair-wise merge candidate, triangle prediction mode and affine mode, the absolute value based MV rounding method may be applied, as indicated in the equation (3). Such MV rounding method is relatively complicated given that it involves multiple steps of calculations. Specifically, the coding device may firstly calculate the absolute value of the input, then perform the rounding of the absolute value, and finally multiply the rounded absolute value with the sign of the input. On the other hand, for the TMVP and the ATMVP, another rounding method is applied where the offset value that is applied prior to bit-wise right-shift is dependent on the sign of the input value. However, such non-unified design may mean that different MV rounding methods need to be implemented for codec hardware implementations.

In another purpose to reduce the hardware implementation complexity, the following methods are proposed to unify the MV rounding operations that are used for inter prediction in the VVC.

In one example, the absolute value based MV rounding method based on the equation (3) is used for various of the MV rounding operations. That is, the same MV rounding process based on the equation (3) is applied to MVs used in different prediction tools including at least the pair-wise merge candidate, triangle prediction mode, affine mode, TMVP, ATMVP and MMVD.

In another example, the rounding method based on the equation (4) is used for various of the MV rounding operations used in the inter prediction. The rounding method used for the TMVP and the ATMP for the current VVC may be also applied to rounding operations in the pair-wise merge candidate, triangle prediction mode and affine mode. That is, the same MV rounding process based on the equation (4) is applied to MVs used in different prediction tools including at least the pair-wise merge candidate, triangle prediction mode, affine mode, TMVP, ATMVP and MMVD.

In yet another example, the regular rounding method is used to round various of the MVs in inter prediction. In this example, the rounded MV value is directly obtained by applying bit-wise shift to the input value biased with the offset, i.e., L is calculated by $$L=(A+\text{Offset})\texttt{>>}\text{Shift}. \quad (5)$$

The above rounding method (i.e., the regular MV rounding based on the equation (5)) may be also the rounding method for sample rounding operations for the VVC specification, such as motion compensated sample interpolation, adaptive in-loop filter (ALF), bi-directional optical flow (BDOF), generalized bi-prediction (GBi) and so forth. Therefore, in this example where the regular rounding method is applied for the pair-wise merge candidate, triangle prediction mode, affine mode, TMVP, ATMVP and MMVD, various of the sample and MV rounding operations in the VVC may be fully unified.

Figure 13:
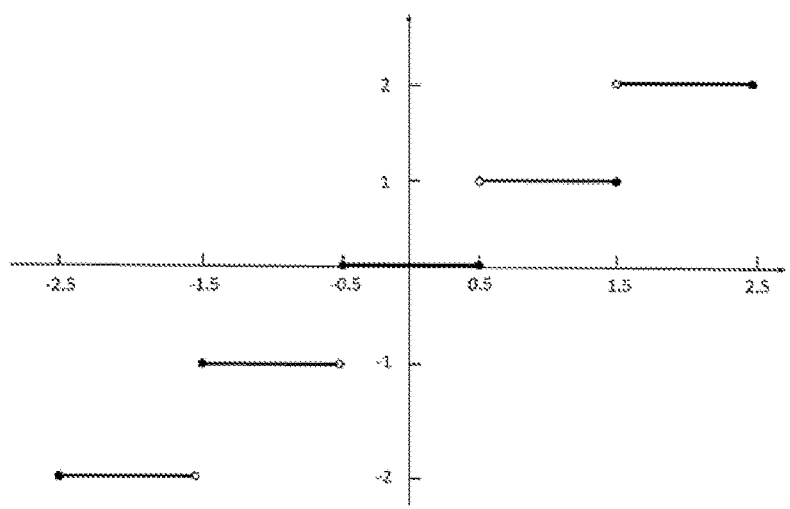
FIG. 13 is a schematic diagram illustrating a mapping function of TMVP/ATMVP based MV rounding in accordance with some implementations of the present disclosure.
Figure 14:
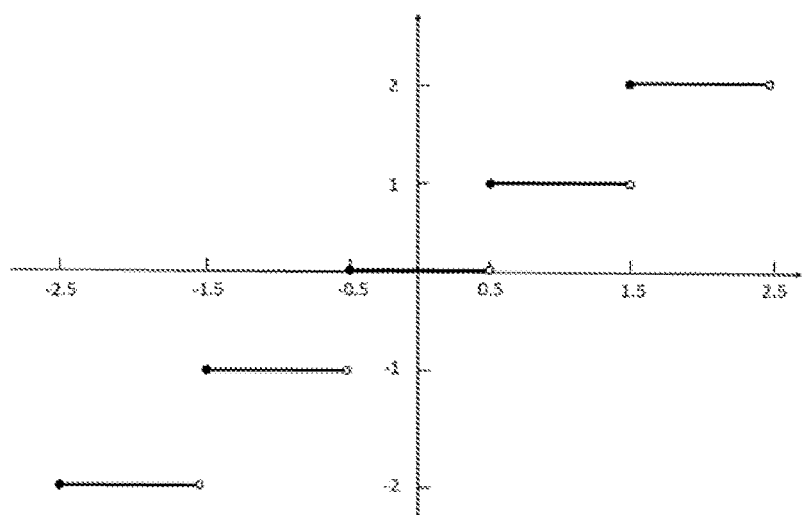
FIG. 14 is a schematic diagram illustrating a mapping function of regular MV rounding in accordance with some implementations of the present disclosure.
Figure 15:
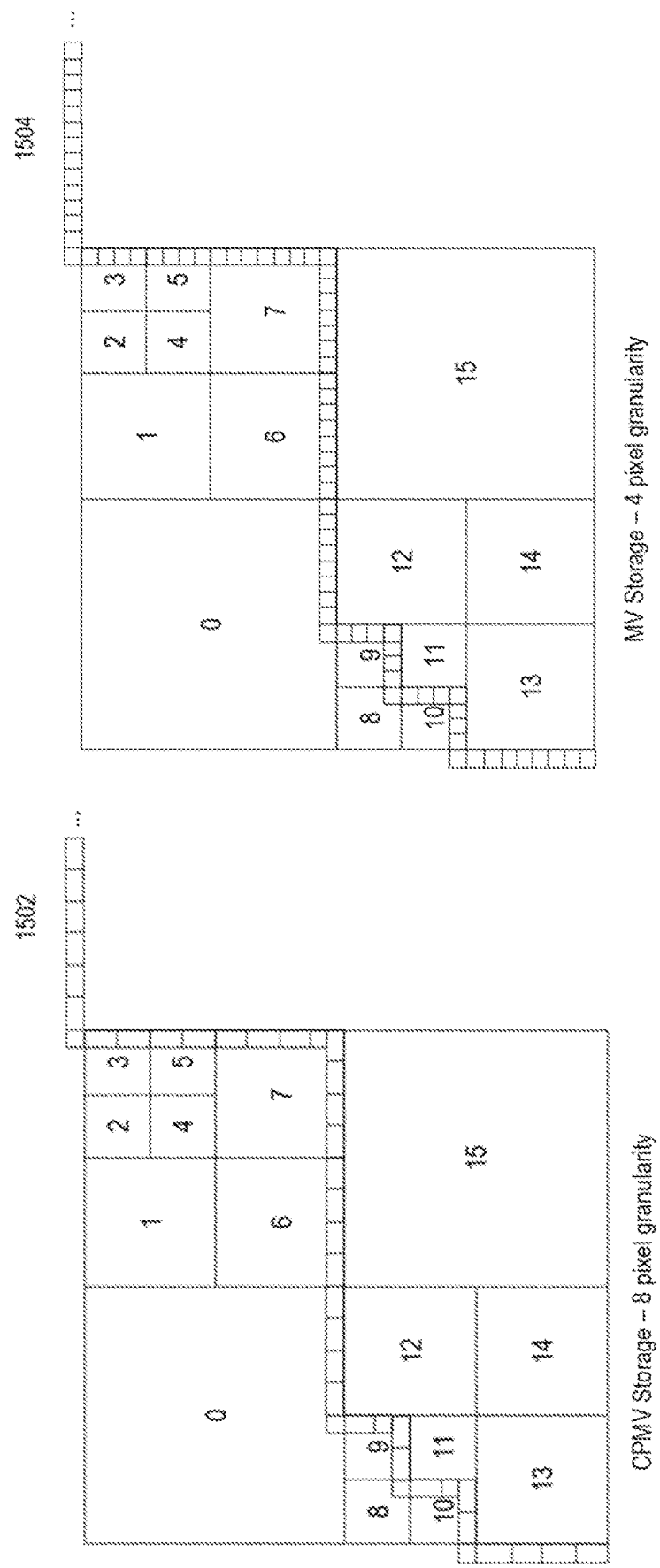
FIG. 15 is a schematic diagram illustrating an example of CPMV and MV context update process for practical VVC implementation in accordance with some implementations of the present disclosure.

FIG. 13 shows the mapping function of absolute based MV rounding; FIG. 14 shows the mapping function of TMVP/ATMVP based MV rounding; and FIG. 15 shows the mapping function of regular MV rounding. Based on the comparison of the mapping functions, the differences among rounded values calculated by the three methods are very minor. Specifically, differences only exist when the input value is equal to −0.5, −1.5, −2.5 . . . . Therefore, it may be expected that the coding performance impact of using different MV rounding methods is relatively negligible.

For the VVC, the MVs may be represented in 18-bit, i.e., the dynamic range of valid MVs are in [−131072, 131071]. For the MMVD mode, the applied MV is generated by adding one signaled offset to one selected merge candidate as specified by the MMVD base index signaled in the bitstream. Similarly, for the DMVR mode, the MVs of each bi-predicted merge block are enhanced by symmetrically applying one motion refinement to the L0 and L1 MVs to minimize the bilateral-matching cost between two prediction signals. However, even if the bit-depth of the selected merge candidate MV is within 18-bit, due to the MV offset (explicitly signaled for the MMVD mode and implicitly derived for the DMVR mode), the final MVs that are applied for each block coded by either MMVD or DMVR mode could be potentially outside the dynamic range of valid MVs, resulting in arithmetic overflow of MV values and causing ambiguity in deriving the final MV values for different implementation platforms. Additionally, similar MV overflow problem also exists in the affine inheritance mode where the CPMVs of one current affine coding block are derived either from the CPMVs of its neighboring affine coding blocks or the sub-block MVs of its neighboring coding blocks, based on the 4-parameter affine model or 6-parameter affine model. In either case, due to the applied linear operations (e.g., additions, subtractions, multiplications), the derived CPMVs could be outside the range of values that can be represented by the valid bit-depth (i.e., 18-bit).

To avoid overflow of MV values, several methods may be used. In an example, a clipping operation is added to be performed on the derived MVs of the MMVD mode and the DMVR mode, as well as the derived CPMVs of the affine inheritance mode to clip them to be within the valid bit-depth, i.e., 18-bit.

In another example, one bit-stream conformance is used to ensure that various of the derived MVs of the MMVD mode and the DMVR mode, and the derived CPMVs of the affine inheritance mode are within the 18-bit dynamic range. That is, the encoder does not signal to the decoder for enabling the MMVD mode, the DMVR mode or the affine inheritance mode for the current block, in the cases where the corresponding derived MVs or CPMVs are beyond the range of [−2$^{17}$, 2$^{17}$−1].

For the VVC, two different MV clipping methods may be applied to various inter prediction modes. Specifically, for the MV clipping operations involved in the AMVP, the ATMVP, the triangle prediction mode and the affine mode, the regular clipping method is applied when the MV values are outside the range represented by the valid bit-depth (i.e., 18-bit) to clip the MV values to the range boundary values, i.e., the MV values that are greater than 2$^{17}$−1 are clipped to be 2$^{17}$−1 and the MV values that are less than −2$^{17}$ are clipped to be −2$^{17}$. The regular clipping method is described by the following equation:

$$L_{clip} = \begin{cases} 2^{17}-1, & L \geq 2^{17} \\ -2^{17}, & L < -2^{17} \\ L, & \text{otherwise} \end{cases} \quad (6)$$

where L is an MV value before rounding; and $L_{clip}$ is a value of a clipped MV.

On the other hand, for the MV clipping operations involved in the explicit normal inter mode and the explicit affine mode, the periodic clipping method is applied which periodically repeats to keep the MV values within the range [−2$^{17}$, 2$^{17}$−1], as indicated by the following equations:

$$M=(L+2^{18})\%2^{18}$$

$$L_{clip}=(M \geq 2^{17})?(M-2^{18}):M \quad (7)$$

where L is an MV value before rounding; M is an intermedium value during the MV clipping operation; and $L_{clip}$ is a value of a clipped MV.

To reduce the complexity while achieving a unified design, the MV clipping methods that are applied for different inter modes in the VVC may be unified. In one example, the regular clipping method as indicated in the equation (6) is used for various of the MV clipping operations. That is, the same clipping process based on the equation (6) is applied to MVs used in the prediction tools including the AMVP mode, ATMVP mode, triangle mode, MMVD mode, DMVR mode, affine inheritance mode, explicit normal inter mode and explicit affine mode. This clipping process may also be applied to derived CPMVs in the MMVD mode, DMVR mode, and affine inheritance mode.

In another example, the periodic clipping method as shown in the equations (7) is used for various of the MV clipping operations. That is, the same clipping process based on the equations (7) is applied to MVs used in the prediction tools including the AMVP mode, ATMVP mode, triangle mode, MMVD mode, DMVR mode, affine inheritance mode, explicit normal inter mode and explicit affine mode. This clipping process may also be applied to derived CPMVs in the MMVD mode, DMVR mode, and affine inheritance mode.

Motion Vector Storage

For the spatial MV prediction in the VVC, one mixed motion field of affine CPMVs (at 8×8 granularity) and sub-block MVs (at 4×4 granularity) is used for affine motion inheritance and merge/skip and advance motion vector prediction (AMVP). Additionally, except for the history-based motion vector prediction, the CPMVs and/or MVs of one coding block can only be predicted from the CPMVs and/or MVs of its casual neighboring blocks in the VVC standard. This means that the CPMVs and/or MVs of the non-adjacent blocks of the coding block may be disposed after the CPMVs and/or MVs of the current block are fully reconstructed. Therefore, in practical hardware implementations, the CPMVs and MVs do not need to be stored for the whole CTU. Instead, a decoder only needs to store a top-row and left-column of CPMVs and MVs as context. FIG. 15 shows CPMV and MV context update process to illustrate such concept. In FIG. 15, the CPMV context is shown in the lightly dotted region 1502 (assuming that the minimum affine block size is 8×8) and the regular MV context is shown in the heavily dotted region 1504 (assuming that the minimum inter prediction block size is 4×4). As shown in FIG. 15, after the CPMVs or MVs of the current coding block are decoded, the corresponding left and top contexts are updated, shifting the two regions 1502 and 1504 further down and to the right until across all the coding blocks inside one CTU.

In an example, assuming that the CTU size is 128×128 and the MVs are stored for each 4-sample segment, there are 32 segments for the top-row, 32 segments for the left-column, and 32 segments for storing top-left context. Moreover, the MV range in the VVC is, for example, 18-bits. Therefore, the local MV storage may require (32+32+32)×(18×2(hor/ver)×2(L0/L1))=6912 bits=864 bytes. Similarly, assuming that the CPMVs are stored for each 8-sample segment, there are 16 segments for the top-row, 16 segments for the left-column, and 16 segments needed to be stored as CPMV contexts. Therefore, the local CPMV storage may need (16+16+16)×(18×3(CPMVs)×2(hor/ver)×2(L0/L1)) =10368 bits=1296 bytes. Further, given that the MV prediction and CPMV prediction may happen across CTU boundaries, one additional line-buffer storage of per-4-sample segment for the picture width is needed, i.e., picWidth/4×(18×2×2). Thus, when 4K video is used, the CPMV and MV storage usage for the spatial CPMV and MV predictions in the VVC are summarized in Table 3 below.

TABLE 3

Memory Size Needed to Store Spatial CPMVs and MVs in the VVC

| Storage | Local MV storage | Local CPMV storage | MV line-buffer | Total |
|---|---|---|---|---|
| Size | 864 bytes | 1296 bytes | 8640 bytes | 10800 bytes |

Figure 16:
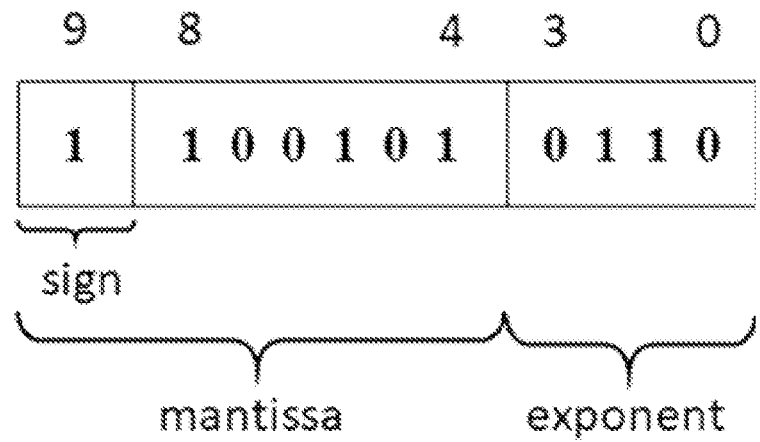
FIG. 16 is a schematic diagram illustrating an example of mantissa-exponent representation of temporal MV storage in accordance with some implementations of the present disclosure.

For a VVC design, temporal MVs may be compressed based on a sub-sampling grid of 8×8 luma samples to reduce the memory storage requirement of storing temporal MVs for temporal motion prediction, such as TMVP and alternative temporal motion vector prediction (ATMVP). Unlike the spatial MVs that are kept in 18-bit, to further reduce the MV storage requirement, the temporal MVs are converted into the mantissa-exponent format before being stored into the external buffer. The motivation of representing 18-bit temporal MVs into the mantissa-exponent format is to quantize large MV values more coarsely while maintaining the precision of small MV values. As shown in FIG. 16, for the VVC, the mantissa-exponent representation for storing the temporal MVs may be configured as 7-bit signed mantissa (1-bit for sign) and 4-bit unsigned exponent.

Thus, for the VVC, different representation methods may be applied to store the spatial MVs and temporal MVs. Specifically, the spatial MVs and CPMVs are stored as 18-bit signed values while the temporal MVs are stored using a 7-bit signed mantissa and 4-bit unsigned exponent (i.e., 11-bit in total). That is, the temporal MVs are stored more efficiently than the spatial MVs and CPMVs. However, in practice, the implementation cost of storing the spatial MVs and CPMVs is more expensive than that of the temporal MV storage because the spatial MVs and CPMVs need to be stored using an on-chip memory while the temporal MVs are stored using an external memory.

For the VVC, one mixed motion field of affine CPMVs and sub-block MVs may be used for affine motion inheritance and merge/skip and advance motion vector prediction (AMVP). Moreover, because both MVs and CPMVs are stored in 18-bit accuracy, a significant amount of on-chip memory (about 10800 bytes as shown in Table 3) becomes necessary to store the MVs and CPMVs of neighboring blocks for spatial MV and CPMV prediction. To reduce such memory requirement, the following methods are proposed to fully or partially convert the spatial MVs and CPMVs into the mantissa-exponent representation format before being stored.

In an example, all the spatial motion information is converted into the mantissa-exponent format before being stored into the on-chip memory. The converted motion information may not only include the MVs and CPMVs of spatial neighboring blocks but also include the MV that are used for the history-based merge candidates (i.e., history-based motion vector prediction (HMVP) MVs). Additionally, different combinations of the mantissa and exponent parameters may be applied, which may provide various trade-offs between storage usage and MV precision. In one exemplary implementation, the mantissa is set to 8 bits and the exponent to 4 bits and Table 4 summarizes the rough on-chip memory usage when such mantissa-exponent setting is applied. Compared to Table 3, using the mantissa-exponent representation for the spatial MVs and CPMVs as well as for HMVP MVs can efficiently reduce the total memory size of on-chip MV/CPMV storage by about 33%. In another example, the mantissa-exponent representation is applied to the spatial MVs and CPMVs, but not to the history-based MV candidates, i.e., the history-based MV candidates in look-up-table (LUT) are still stored in the original 18-bit.

TABLE 4

Memory Size needed to Store Spatial CPMVs and
MVs with Application of Mantissa
(8)-Exponent (4) Based MV Representation

| Storage | Local MV storage | Local CPMV storage | MV line-buffer | Total |
|---|---|---|---|---|
| Size | 576 bytes | 864 bytes | 5760 bytes | 7200 bytes |

Due to the precision loss incurred by MV quantization, the conversion to the mantissa-exponent format for all spatial MVs and CPMVs and the history-based MV candidates may lead to some noticeable coding performance drop. Meanwhile, the frequent conversion of the MV and CPMV values between the original MV domain and the mantissa-exponent MV domain may introduce additional coding complexity at both the encoder and decoder sides. Further, it can be seen from Table 3 that compared to the local MVs and CPMVs, the MVs that are stored in the line-buffer consume much more on-chip memory for storage, i.e., 80% of the total memory size. To achieve a better trade-off between the MV and CPMV prediction efficiency and on-chip memory reduction, in another example, the mantissa-exponent representation is only applied to the MVs that are stored in the line-buffer (i.e., the neighboring MVs from the top CTU) while all the MVs and CPMVs that are stored in the local buffer (i.e., the neighboring MVs and CPMVs within the same CTU) are still stored in the original 18-bit. Since the MV quantization is only applied to the MVs in the line-buffer, in this example, the corresponding coding performance impact can be effectively reduced compared to the previous example where all the spatial MVs and CPMVs, and the history-based MV candidates are converted. Meanwhile, the complexity overhead of converting the MVs and CMPVs is reduced because no MVs or CPMVs in the local buffer need to be converted, and only the neighboring MVs and CPMVs that are from the top CTU row are converted to (for MV storage) or from (for MV fetching) the mantissa-exponent domain.

Table 5 shows the corresponding on-chip memory usage when the line-buffer MVs are stored in 11-bit mantissa (7)-exponent (4) representation format. In this way, the total memory size of on-chip MV/CPMV storage is reduced by about 32%, comparable to 33% reduction achieved in the example shown in Table 3.

TABLE 5

Memory Size Needed to Store Line-Buffer CPMVs and
MVs Using Mantissa (7)-Exponent (4) Format

| Storage | Local MV storage | Local CPMV storage | MV line-buffer | Total |
|---|---|---|---|---|
| Size | 864 bytes | 1296 bytes | 5280 bytes | 7440 bytes |

In yet another example, all the spatial MVs and CPMVs are compressed based on the mantissa-exponent representation. To achieve a better trade-off between MV/CPMV prediction efficiency and storage requirement, different mantissa-exponent parameters are used for compressing different spatial MVs. For example, the MVs and CPMVs stored in the local buffer and the MVs stored in the line buffer may be compressed using different parameters. Due to the fact that the memory size used to store the MVs in the line-buffer is much more significant than that used to store the MVs and CPMVs in the local buffer, the MVs in the line-buffer may be compressed more aggressively than the MVs and/or CPMVs stored in the local buffer. In one exemplary implementation, 12-bit of mantissa (8)-exponent (4) representation format for compressing the MVs and CPMVs in the local storage and 11-bit of mantissa (7)-exponent (4) representation format for compressing the MVs in the line-buffer may be used. Further, the compressed MVs in the local buffer may include or exclude the MVs used for HMVP. That is, the history-based MV candidates in the LUT may be stored in either the compressed format or the original 18-bit.

In the above examples, the storage requirement for spatial MVs and CPMVs is reduce, thereby reducing the codec implementation cost. Using the mantissa-exponent representation to represent the spatial MVs and CPMVs and temporal MVs in the storage further reduces the hardware implementation complexity.

Figure 17:
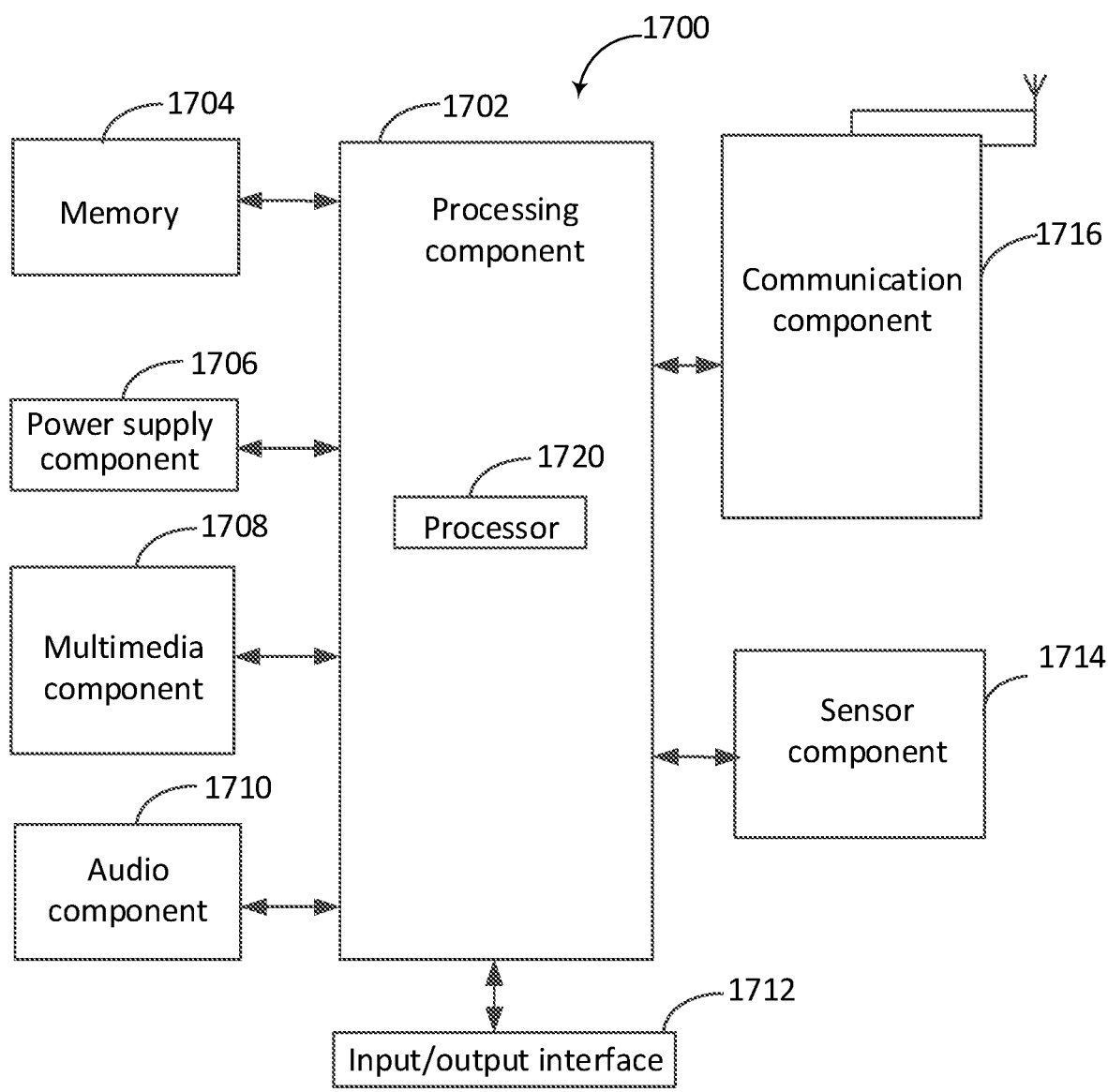
FIG. 17 is a block diagram illustrating an exemplary apparatus for video coding in accordance with some implementations of the present disclosure.

FIG. 17 is a block diagram illustrating an apparatus for video coding in accordance with some implementations of the present disclosure. The apparatus 1700 may be a terminal, such as a mobile phone, a tablet computer, a digital broadcast terminal, a tablet device, or a personal digital assistant.

As shown in FIG. 17, the apparatus 1700 may include one or more of the following components: a processing component 1702, a memory 1704, a power supply component 1706, a multimedia component 1708, an audio component 1710, an input/output (I/O) interface 1712, a sensor component 1714, and a communication component 1716.

The processing component 1702 usually controls overall operations of the apparatus 1700, such as operations relating to display, a telephone call, data communication, a camera operation and a recording operation. The processing component 1702 may include one or more processors 1720 for executing instructions to complete all or a part of steps of the above method. Further, the processing component 1702 may include one or more modules to facilitate interaction between the processing component 1702 and other components. For example, the processing component 1702 may include a multimedia module to facilitate the interaction between the multimedia component 1708 and the processing component 1702.

The memory 1704 is configured to store different types of data to support operations of the apparatus 1700. Examples of such data include instructions, contact data, phonebook data, messages, pictures, videos, and so on for any application or method that operates on the apparatus 1700. The memory 1704 may be implemented by any type of volatile or non-volatile storage devices or a combination thereof, and the memory 1704 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1706 supplies power for different components of the apparatus 1700. The power supply component 1706 may include a power supply management system, one or more power supplies, and other components associated with generating, managing and distributing power for the apparatus 1700.

The multimedia component 1708 includes a screen providing an output interface between the apparatus 1700 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1708 may include a front camera and/or a rear camera. When the apparatus 1700 is in an operation mode, such as a shooting mode or a video mode, the front camera and/or the rear camera may receive external multimedia data.

The audio component 1710 is configured to output and/or input an audio signal. For example, the audio component 1710 includes a microphone (MIC). When the apparatus 1700 is in an operating mode, such as a call mode, a recording mode and a voice recognition mode, the microphone is configured to receive an external audio signal. The received audio signal may be further stored in the memory 1704 or sent via the communication component 1716. In some examples, the audio component 1710 further includes a speaker for outputting an audio signal.

The I/O interface 1712 provides an interface between the processing component 1702 and a peripheral interface module. The above peripheral interface module may be a keyboard, a click wheel, a button, or the like. These buttons may include but not limited to, a home button, a volume button, a start button and a lock button.

The sensor component 1714 includes one or more sensors for providing a state assessment in different aspects for the apparatus 1700. For example, the sensor component 1714 may detect an on/off state of the apparatus 1700 and relative locations of components. For example, the components are a display and a keypad of the apparatus 1700. The sensor component 1714 may also detect a position change of the apparatus 1700 or a component of the apparatus 1700, presence or absence of a contact of a user on the apparatus 1700, an orientation or acceleration/deceleration of the apparatus 1700, and a temperature change of apparatus 1700. The sensor component 1714 may include a proximity sensor configured to detect presence of a nearby object without any physical touch. The sensor component 1714 may further include an optical sensor, such as a CMOS or CCD image sensor used in an imaging application. In some examples, the sensor component 1714 may further include an acceleration sensor, a gyroscope sensor, a magnetic sensor, a pressure sensor, or a temperature sensor.

The communication component 1716 is configured to facilitate wired or wireless communication between the apparatus 1700 and other devices. The apparatus 1700 may access a wireless network based on a communication standard, such as WiFi, 4G, or a combination thereof. In an example, the communication component 1716 receives a broadcast signal or broadcast related information from an external broadcast management system via a broadcast channel. In an example, the communication component 1716 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1700 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 18:
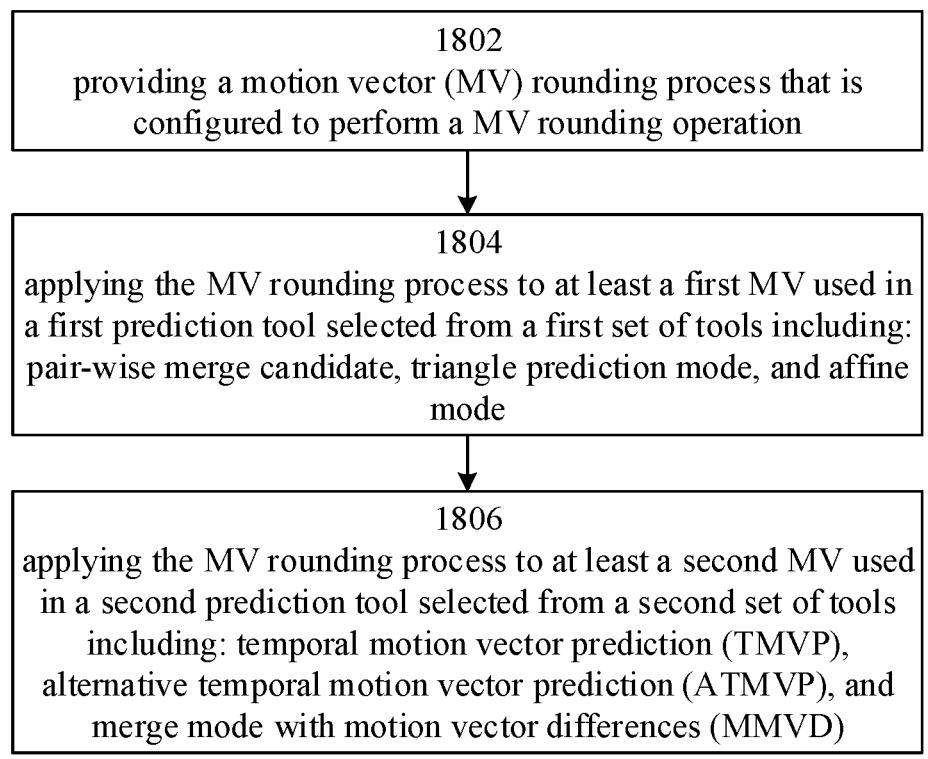
FIG. 18 is a flowchart illustrating an exemplary process of motion vector rounding for video coding in accordance with some implementations of the present disclosure.

FIG. 18 is a flowchart illustrating an exemplary process of motion vector rounding for video coding.

In step 1802, the processor 1720 provides a motion vector (MV) rounding process that is configured to perform a MV rounding operation.

The MV rounding process may be provided, for example by an apparatus, circuitry, or computer program code block.

In step 1804, the processor 1720 applies the MV rounding process to at least a first MV used in a first prediction tool selected from a first set of tools including: pair-wise merge candidate, triangle prediction mode, and affine mode.

In step 1806, the processor 1720 applies the MV rounding process to at least a second MV used in a second prediction tool selected from a second set of tools including: temporal motion vector prediction (TMVP), alternative temporal motion vector prediction (ATMVP), and merge mode with motion vector differences (MMVD).

Figure 19:
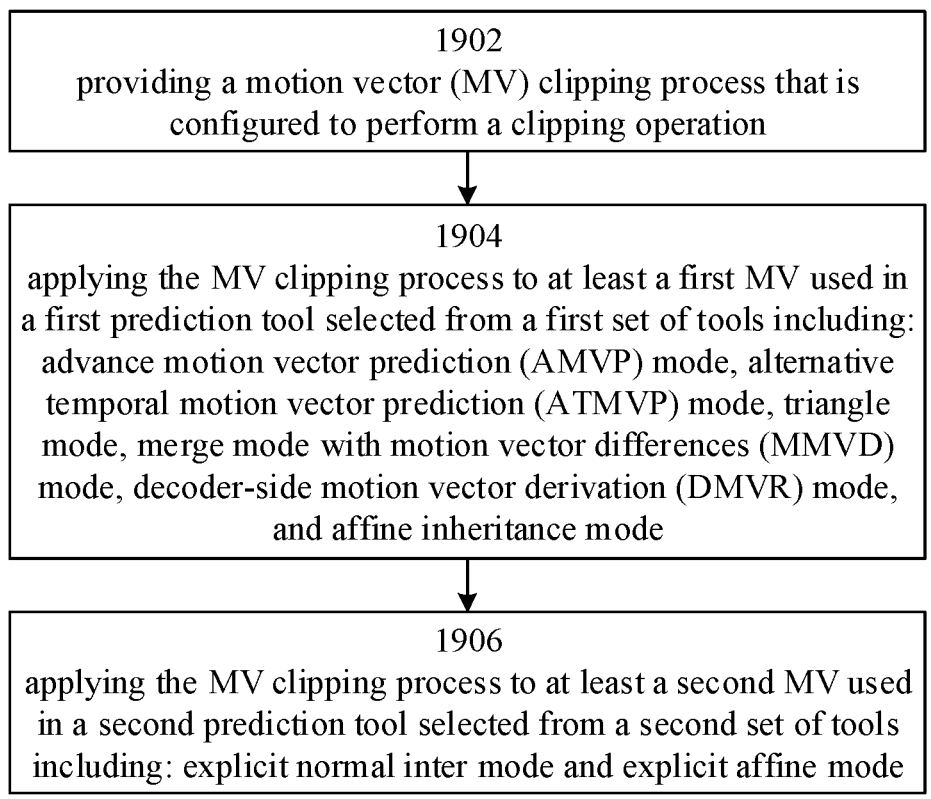
FIG. 19 is a flowchart illustrating an exemplary process of motion vector clipping for video coding in accordance with some implementations of the present disclosure

FIG. 19 is a flowchart illustrating an exemplary process of motion vector clipping for video coding.

In step 1902, the processor 1720 provides a motion vector (MV) clipping process that is configured to perform a clipping operation.

In step 1904, the processor 1720 applies the MV clipping process to at least a first MV used in a first prediction tool selected from a first set of tools including: advance motion vector prediction (AMVP) mode, alternative temporal motion vector prediction (ATMVP) mode, triangle mode, merge mode with motion vector differences (MMVD) mode, decoder-side motion vector derivation (DMVR) mode, and affine inheritance mode.

In step 1906, the processor 1720 applies the MV clipping process to at least a second MV used in a second prediction tool selected from a second set of tools including: explicit normal inter mode and explicit affine mode.

In some examples, there is provided an apparatus for video coding. The apparatus includes a processor 1720; and a memory 1704 configured to store instructions executable by the processor; where the processor, upon execution of the instructions, is configured to perform a method as illustrated in FIG. 18 or FIG. 19.

In some other examples, there is provided a non-transitory computer readable storage medium 1704, having instructions stored therein. When the instructions are executed by a processor 1720, the instructions cause the processor to perform a method as illustrated in FIG. 18 or FIG. 19.

The disclosure further provides a method for video decoding. The method comprises: determining an inter prediction process;

in response to determining the inter prediction process is one of derivation processes for advance motion vector prediction (AMVP) mode, alternative temporal motion vector prediction (ATMVP) mode, merge mode with motion vector differences (MMVD) mode, decoder-side motion vector derivation (DMVR) mode, affine inheritance mode or explicit affine mode, performing a motion vector (MV) clipping operation to at least one MV in the inter prediction process according to a first MV clipping mode, wherein an upper limit of the first MV clipping mode is $2^{17}-1$ and the lower limit of the first MV clipping mode is $-2^{17}$.

In an embodiment, the MV clipping operation may be defined by an equation of:

$$L_{clip} = \begin{cases} 2^{17} - 1, & L \geq 2^{17} \\ -2^{17}, & L < -2^{17} \\ L, & \text{otherwise} \end{cases}$$

where L is an MV value before rounding; and $L_{clip}$ is a value of a clipped MV.

In an embodiment, the method for video decoding further comprises applying the MV clipping process to all MVs and CPMVs derived in merge mode with motion vector differences (MMVD) mode, decoder-side motion vector derivation (DMVR) mode, and affine inheritance mode.

The disclosure further provides an apparatus for video coding. The apparatus comprises: a processor; and a memory configured to store instructions executable by the processor. The processor, upon execution of the instructions, is configured to: determine an inter prediction process; in response to determining the inter prediction process is one of derivation processes for advance motion vector prediction (AMVP) mode, alternative temporal motion vector prediction (ATMVP) mode, merge mode with motion vector differences (MMVD) mode, decoder-side motion vector derivation (DMVR) mode, affine inheritance mode or explicit affine mode, perform a motion vector (MV) clipping operation to at least one MV in the inter prediction process according to a first MV clipping mode, wherein an upper limit of the first MV clipping mode is $2^{17}-1$ and the lower limit of the first MV clipping mode is $-2^{17}$.

In an embodiment, the first MV clipping mode may be defined by an equation of:

$$L_{clip} = \begin{cases} 2^{17} - 1, & L \geq 2^{17} \\ -2^{17}, & L < -2^{17} \\ L, & \text{otherwise} \end{cases}$$

where L is an MV value before rounding; and $L_{clip}$ is a value of a clipped MV.

In an embodiment, the processor may be further configured to: apply the MV clipping process to all MVs and CPMVs derived in merge mode with motion vector differences (MMVD) mode, decoder-side motion vector derivation (DMVR) mode, and affine inheritance mode.

The disclosure further provides a non-transitory computer readable storage medium, having instructions stored therein. When the instructions are executed by a processor, the instructions cause the processor to determine an inter prediction process;

in response to determining the inter prediction process is one of derivation processes for advance motion vector prediction (AMVP) mode, alternative temporal motion vector prediction (ATMVP) mode, merge mode with motion vector differences (MMVD) mode, decoder-side motion vector derivation (DMVR) mode, affine inheritance mode or explicit affine mode, perform a motion vector (MV) clipping operation to at least one MV in the inter prediction process according to a first MV clipping mode, wherein an upper limit of the first MV clipping mode is $2^{17}-1$ and the lower limit of the first MV clipping mode is $-2^{17}$.

In an embodiment, the first MV clipping mode may be defined by an equation of:

$$L_{clip} = \begin{cases} 2^{17} - 1, & L \geq 2^{17} \\ -2^{17}, & L < -2^{17} \\ L, & \text{otherwise} \end{cases}$$

where L is an MV value before rounding; and $L_{clip}$ is a value of a clipped MV.

In an embodiment, the instructions further cause the processor to: apply the MV clipping process to all MVs and CPMVs derived in merge mode with motion vector differences (MMVD) mode, decoder-side motion vector derivation (DMVR) mode, and affine inheritance mode.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video encoding, comprising:
determining an inter prediction process; and
in response to determining the inter prediction process is one of derivation processes for advance motion vector prediction (AMVP) mode, alternative temporal motion vector prediction (ATMVP) mode, merge mode with motion vector differences (MMVD) mode, decoder-side motion vector derivation (DMVR) mode, affine inheritance mode or explicit affine mode, performing a motion vector (MV) clipping operation to at least one MV in the inter prediction process according to a first MV clipping mode,
wherein an upper limit of the first MV clipping mode is $2^{17}-1$ and the lower limit of the first MV clipping mode is $-2^{17}$.

2. The method of claim 1, wherein the MV clipping operation is defined by an equation of:

$$L_{clip} = \begin{cases} 2^{17} - 1, & L \geq 2^{17} \\ -2^{17}, & L < -2^{17} \\ L, & \text{otherwise} \end{cases}$$

where
L is an MV value before rounding; and
$L_{clip}$ is a value of a clipped MV.

3. The method of claim 1, further comprising applying the MV clipping process to all MVs and CPMVs derived in merge mode with motion vector differences (MMVD) mode, decoder-side motion vector derivation (DMVR) mode, and affine inheritance mode.

4. An apparatus for video encoding, comprising:
a processor; and
a memory configured to store instructions executable by the processor;
wherein the processor, upon execution of the instructions, is configured to:
determine an inter prediction process; and
in response to determining the inter prediction process is one of derivation processes for advance motion vector prediction (AMVP) mode, alternative temporal motion vector prediction (ATMVP) mode, merge mode with motion vector differences (MMVD) mode, decoder-side motion vector derivation (DMVR) mode, affine inheritance mode or explicit affine mode, perform a motion vector (MV) clipping operation to at least one MV in the inter prediction process according to a first MV clipping mode,
wherein an upper limit of the first MV clipping mode is $2^{17}-1$ and the lower limit of the first MV clipping mode is $-2^{17}$.

5. The apparatus of claim 4, wherein the first MV clipping mode is defined by an equation of:

$$L_{clip} = \begin{cases} 2^{17}-1, & L \geq 2^{17} \\ -2^{17}, & L < -2^{17} \\ L, & \text{otherwise} \end{cases}$$

where
L is an MV value before rounding; and
$L_{clip}$ is a value of a clipped MV.

6. The apparatus of claim 4, the processor is further configured to: apply the MV clipping process to all MVs and CPMVs derived in merge mode with motion vector differences (MMVD) mode, decoder-side motion vector derivation (DMVR) mode, and affine inheritance mode.

7. A method of storing a bitstream, comprising:
generating a bitstream by performing the method according to claim 1; and
storing the bitstream on a non-transitory computer readable storage medium.

8. The method of claim 7, wherein the first MV clipping mode is defined by an equation of:

$$L_{clip} = \begin{cases} 2^{17}-1, & L \geq 2^{17} \\ -2^{17}, & L < -2^{17} \\ L, & \text{otherwise} \end{cases}$$

where
L is an MV value before rounding; and
$L_{clip}$ is a value of a clipped MV.

9. The method of claim 7, wherein MV clipping process are applied to all MVs and CPMVs derived in merge mode with motion vector differences (MMVD) mode, decoder-side motion vector derivation (DMVR) mode, and affine inheritance mode.

* * * * *